United States Patent [19]

Gale et al.

[11] 4,293,428
[45] Oct. 6, 1981

[54] PROPOXYLATED ETHOXYLATED SURFACTANTS AND METHOD OF RECOVERING OIL THEREWITH

[75] Inventors: Walter W. Gale; Maura C. Puerto, both of Houston; Thomas L. Ashcraft, Baytown; Rhoderick K. Saunders, Sinton; Ronald L. Reed, Houston, all of Tex.

[73] Assignee: Exxon Production Research Company, Houston, Tex.

[21] Appl. No.: 870,313

[22] Filed: Jan. 18, 1978

[51] Int. Cl.$^3$ .............................................. C09K 3/00
[52] U.S. Cl. ............................ 252/8.55 D; 166/273; 166/274; 166/275; 252/352; 252/353; 252/354
[58] Field of Search ............... 252/8.55 D, 352, 353, 252/354, DIG. 1; 166/273, 274, 275; 260/458 R, 458 C, 513 R, 512 R

[56] References Cited
U.S. PATENT DOCUMENTS

| | | | |
|---|---|---|---|
| 2,174,761 | 10/1939 | Schuette et al. | 260/458 |
| 2,674,619 | 4/1954 | Lundsted | 260/485 |
| 2,677,700 | 5/1954 | Jackson et al. | 260/488 |
| 2,978,409 | 4/1961 | Greenwald et al. | 252/8.55 D |
| 3,036,130 | 5/1962 | Jackson et al. | 260/584 |
| 3,110,736 | 11/1963 | Groote et al. | 260/615 |
| 3,508,612 | 4/1970 | Reisberg et al. | 166/274 |
| 3,513,009 | 5/1970 | Hans et al. | 252/152 |
| 3,565,939 | 2/1971 | Beiser | 260/458 R |
| 3,827,497 | 8/1974 | Dycus et al. | 166/274 |
| 3,890,239 | 6/1975 | Dycus et al. | 252/8.55 D |
| 4,043,922 | 8/1977 | Palmer et al. | 252/8.55 D |
| 4,110,229 | 8/1978 | Carlin et al. | 252/8.55 D |
| 4,125,156 | 11/1978 | Glinsmann et al. | 252/8.55 D |
| 4,134,415 | 1/1979 | Flournoy et al. | 252/8.55 D |
| 4,152,290 | 5/1979 | Flournoy et al. | 252/8.55 D |
| 4,181,178 | 1/1980 | Savins | 252/8.55 D X |

OTHER PUBLICATIONS

"Polyolyethylene Alcohols", Nonionic Surfactants pp. 118-125, 1967, N.J. Schick, ed.

Primary Examiner—J. L. Barr
Attorney, Agent, or Firm—Michael A. Nametz

[57] ABSTRACT

A method for recovering oil from a subterranean formation is disclosed wherein a novel solution is injected into and driven through the formation. The solution contains an effective amount of surface-active agent having the general formula $$R_1O(C_3H_6O)_m(C_2H_4O)_nYX$$

wherein
$R_1$ is a linear or branched alkyl radical, an alkenyl radical, or an alkyl or alkenyl substituted benzene radical, the non-aromatic portion of the radical containing from about 6 to about 24 carbon atoms;
m has an average value of between about 1 and about 10;
n has an average value of between about 1 and about 10;
Y is a hydrophilic group; and
X is a cation, preferably monovalent.

26 Claims, 1 Drawing Figure

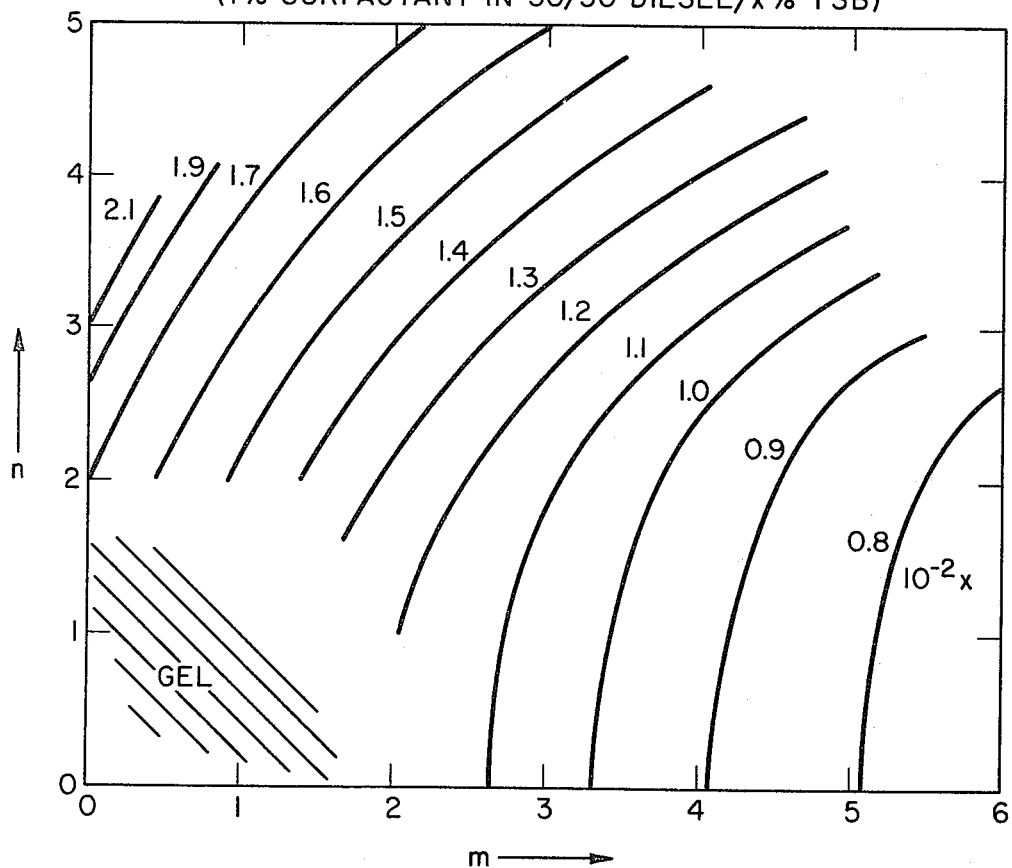

PROPOXYLATED ETHOXYLATED SURFACTANTS AND METHOD OF RECOVERING OIL THEREWITH

BACKGROUND OF THE INVENTION

1. Field of the Invention

This invention relates to a method for recovering oil from a subterranean formation, and more particularly to special surfactant systems to be used with waterflooding techniques to improve the oil displacement efficiency of waterfloods.

2. Description of the Prior Art

The petroleum industry has recognized for many years that only a portion of the original oil in an oil reservoir can be produced by what is referred to as "primary recovery," i.e. where only initial formation energy is used to recover the crude oil. It is also well known that conventional methods of supplementing primary recovery are relatively inefficient. Typically, a reservoir retains over half its original oil even after the application of currently available "secondary" recovery techniques. Accordingly, there is a continuing need for improved recovery methods which will substantially increase the ultimate yield of petroleum from subterranean reservoirs.

"Waterflooding" is by far the most economical and widely practiced of secondary recovery methods. In such a process, water or other aqueous fluid is introduced through injection wells to drive oil through the formation to offset producing wells. Much of the current work in secondary recovery technology has been directed toward improving the efficiency of waterflooding processes.

Surface-active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. Because the normal interfacial tension between the reservoir oil and water used for flooding is so high, these discrete droplets are unable to deform sufficiently to pass through narrow constrictions in the pore channels of the formation. When surfactants are added to the flood water, they lower the interfacial tension between the water and the reservoir oil and permit oil droplets to deform, coalesce and flow with the flood water toward producing wells. It is generally accepted that the interfacial tension between the surfactnt-containing phase and the reservoir oil must be reduced to less than 0.1 dyne/cm for low-tension flooding to give effective recovery.

One difficulty in the use of surfactants in general and anionic surfactants in particular is their tendency to be depleted from the injected solution as the solution moves through the reservoir. The surfactants tend to be lost by precipitation as insoluble salts of ionic materials, such as polyvalent metal ions, that may be dissolved in the fluid in the reservoir; by adsorption on the reservoir rocks; by physical entrapment within the pore spaces of the rock matrix; and/or by chemical conversion, such as hydrolysis of an active component of the surfactant system to a component that is insoluble, inactive, or detrimental in that system. If the surface-active agent is removed from the waterflood solution as it moves through the reservoir, the agent is not available to act at the oil/water interface. Quite naturally, surfactant depletion decreases oil recovery efficiency.

In a waterflood oil recovery process where the water contains a surfactant, the efficiency of the oil displacement is strongly affected by (1) the rate of surfactant loss and (2) the surface activity (extent of lowering of the oil/water interfacial tension) of the surfactant.

Another difficulty observed in the use of many anionic surfactants is the inability of the surfactant to exhibit high surface activity in high temperature reservoirs (i.e., temperatures of about 120° F. or more) and/or in aqueous solutions containing high concentrations of inorganic salts. Thus, many oilfield brines, e.g. formation brines which are considered herein to contain high concentrations of inorganic salts, generally contain over 2% NaCl and over 0.5% $CaCl_2$ and $MgCl_2$ total; concentrations of over 4% NaCl and 2% $CaCl_2$ and $MgCl_2$ are common. (All percentages reported herein are percents by weight, unless otherwise noted.) As used herein, the term formation brine includes not only brine originally present in the formation but also brines subsequently introduced into the formation, e.g. during flooding operations. Of course, formation brines are encountered which do not contain such high concentrations of inorganic salts, but generally such brines are less common and in any event still contain what would be considered "high" concentrations of inorganic salts by most standards.

When the typical salt concentrations of many formation brines are considered, it is not surprising that development of suitable surfactants for reservoir environments has met with little success. As mentioned, formation brines often contain concentrations of sodium chloride ranging from 2% to over 10%, and combined calcium and magnesium chloride concentrations from 0.5% to over 2.0%. These concentrations may range up to the solubility limits of said salts in water at formation temperature. To place the development of surfactants useful under reservoir conditions in perspective surfactants useful as detergents in hard water contemplate salt concentrations which are orders of magnitude less, e.g. sodium chloride concentrations no higher than about 0.2% and combined calcium and magnesium chloride concentrations of no more than 0.05%. In fact, most detergent surfactants are entirely unsuited for use in reservoir environments.

Further examples of the typically high formation brine salt concentrations may be found in A. G. Ostroff, "Introduction to Oilfield Water Technology", p. 5 (1965). For comparison, typical water hardness values in the detergent art may be found in K. Durham, "Surfact Activity and Detergency," p. 96, 98 and 137-142 (1961).

The problem is further complicated by the fact that although a given surfactant may be soluble in formation brines, this is no assurance that it will be effective in lowering interfacial tensions sufficiently for enhanced oil recovery.

Generally, as the temperature of the reservoir and concentration of inorganic salts in the brine solution of the reservoir increase, the surfact activity of conventional anionic surfactants decreases. Surfactants have been suggested which exhibit some tolerance to either high temperature or high salt concentrations. None of these surfactants, however, have the ability to exhibit a high degree of surface activity under all types of reservoir conditions, including high salt concentrations or high temperature, or both high temperature and high salt concentration reservoirs.

It has generally been found that positioning an ethoxy group adjacent to the sulfonate or sulfate group of a given surfactant tends to increase the solubility of such surfactant in water; moreover, increasing the number of ethoxy groups tends to increase the water solubility of such surfactants and also provides improved solubility characteristics in water having high concentrations of inorganic salts such as sodium chloride, magnesium chloride, and calcium chloride. Accordingly such surfactants have been proposed for use in environments having high concentrations of such inorganic salts.

Thus, it has been reported in U.S. Pat. No. 3,508,612, issued to Reisberg et al, that a two-component surfactant mixture exemplified by a petroleum sulfonate and a salt of a sulfated polyalkoxylated alcohol (e.g. $C_{12-15}O(C_2H_4O)_3SO_3Na$) exhibits improved tolerance against high salt concentration environments. It has been found, however, that the surface activity of the two ingredients in this composition is very sensitive to the salt content of the brine. This sensitivity is important because in commercial operations concentrations may vary from time to time and because the concentration of the surfactant composition will vary as it moves through the formation because of mixing with in-situ water, non-uniform movement and the like. This results in both surfactant loss to the formation and loss of surface activity.

A major cause of the problems associated with the use of polyalkoxylated surfactants is due to the fact that as the fluid containing these surfactants moves through a formation, a chromatographic-type separation of surfactant components takes place. This may be better understood by considering the general chemical composition of a polyalkoxylated surfactant. Generally, such surfactants are prepared by alkoxylating a suitable organic substrate using a strong base or a Lewis acid catalyst such as sodium hydroxide, $BF_3$ or the like, followed by sulfation or sulfonation. While the resulting product may be purified to some extent, the resulting "pure" surfactant ultimately used in the field is, in reality, a mixture of discrete compounds, each having been alkoxylated to a different extent. For example, when ethoxylating a primary alcohol, ROH, the resulting product may be represented as $RO(EO)_{4.2}H$ (where EO represents the ethoxy group ($C_2H_4O$) and the subscript 4.2 indicates the average number of ethoxy groups). Actually, the product comprises a mixture of adducts and unreacted alcohols, for example R OH, RO(EO)<sub>1</sub>H, RO(EO)<sub>2</sub>H, RO(EO)<sub>3</sub>H,
RO(EO)<sub>4</sub>H, RO(EO)<sub>5</sub>H, RO(EO)<sub>6</sub>H, . . . ,
RO(EO)<sub>12</sub>H, . . .

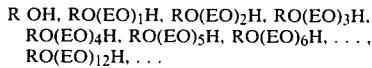

and so forth, in different proportions such that an average value of 4.2 ethoxy groups has been achieved. It has been found that each component compound demonstrates a substantially different surface activity at a given concentration of inorganic salts.

Thus, while the surfactant may possess some properties similar to a purified, single component surfactant and may give acceptable results in small scale laboratory tests, field results can vary substantially due to extensive chromatographic-type separation of one or more components during flooding. A less subtle variation of this problem has been noted previously where a mixture of two (or more) different types of surfactants (cosurfactants) are utilized, such as the approach suggested in U.S. Pat. No. 3,811,505, issued to Fluornoy et al.

Thus, as the surfactant-containing fluid moves through the vast distances of a reservoir (compared to short laboratory cores), the various surfactant components separate. Each separated component is in a similar environment, i.e. reservoir brine of a given inorganic salt concentration. However, except for that discrete component whose properties are acceptable in the reservoir brine, all remaining components exist in an unacceptable environment. In other words, all other discrete components, when separated, will demonstrate poor surface active properties in the reservoir brine.

SUMMARY OF THE INVENTION

The present invention relates to a flooding process and a composition used in such flooding process, which alleviates the above problems. In accordance with this invention, a process is provided for recovering oil from a subterranean formation wherein fluid containing a surfactant is injected into the formation. The surfactant provides high degree of surface activity in reservoirs having a high concentration of inorganic salts. The surfactant is selected from the group of compounds characterized by the general formula:

$$R_1O(C_3H_6O)_m(C_2H_4O)_nYX$$

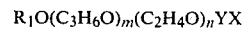

wherein
$R_1$ is a linear or branched alkyl radical, an alkenyl radical, or an alkyl or alkenyl substituted benzene radical, the non-aromatic portion of the radical containing from 6 to 24 carbon atoms;
m has an average value of from about 1 to about 10;
n has an average value of from about 1 to about 10;
Y is a hydrophilic group; and
X is a cation, preferably monovalent.

The order of the alkoxy groups has been discovered to be highly important in alleviating the problems outlined above.

In a preferred form of the invention, Y is a sulfate or sulfonate group and $R_1$ is a branched alkyl radical having at least two branching groups.

Where Y is a sulfonate group, a general formula for Y may be written as:

$$-R_2-SO_3-$$
$$|$$
$$R_3$$

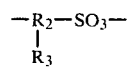

wherein
$R_2$ is an alkyl, cycloalkyl, alkenyl, alkylaryl or aryl radical containing up to 8 carbon atoms;
$R_3$ is a hydrogren atom, a hydroxyl radical, or an aliphatic radical containing from 1–8 carbon atoms;

Most preferably, m and n each range between about 2 and about 6. Ranges of optimum numbers of propoxy and ethoxy groups (m an n) for different salt concentrations have been discovered and this further enhances the advantages of these surfactants. The surfactant system of the invention is, therefore, highly effective in brines commonly found in oil field environments.

The agents of this invention can be used in various fluids including an aqueous solution, an oil solution, a microemulsion which is miscible with the crude oil and/or formation water, or a microemulsion which is immiscible with the formation crude oil and/or formation water.

The agents as provided in this invention have good resistance to precipitation and adsorption when passing through a formation and will effectively reduce interfacial tension between the injected fluid and the in-place crude oil even in brine environments wherein high concentrations of inorganic salts exist. Moreover, the sulfonates in particular exhibit very good resistance to hydrolysis in high-temperature reservoirs.

Most importantly, many discrete component compounds of the surfactant, resulting from the varying degrees of alkoxylation, exhibit similar surface active properties for a given concentration of inorganic salts. Therefore, the effect of chromatographic separation of some of the surfactant components in a formation during flooding is significantly reduced, thereby enhancing oil recovery. This is believed to be due to the order in which alkoxylation is accomplished, i.e. propoxylation first and ethoxylation second. This is apparently due to modification of the water-ethoxy group interaction provided by the presence of the propoxy groups. These agents therefore offer significant advantages over the agents used heretofore.

BRIEF DESCRIPTION OF THE DRAWING

The drawing is a plot illustrating optimal combinations of propoxy and ethoxy groups in a surfactant of the invention for given salt concentrations at 74° F. and in admixture with diesel fuel.

DESCRIPTION OF THE PREFERRED EMBODIMENT

The benefits and advantages which can be obtained in the practice of this invention are achieved through the use of a new and improved class of surface-active agents. As will be discussed in more detail hereinafter, these agents can be used in any type of surfactant flooding process for recovering crude oil from a subterranean oil-bearing formation. They are particularly useful in reservoirs having high concentrations of inorganic salts.

In the practice of this invention, a solution is provided which contains an effective amount of a surface-active agent selected from the group of compounds having the general formula:

$$R_1O(C_3H_6O)_m(C_2H_4O)_nYX$$

wherein
 $R_1$ is a linear or branched alkyl radical, an alkenyl radical, or an alkyl or alkenyl substituted benzene radical, the non-aromatic portion of the radical containing from 6 to 24 carbon atoms;
 m has an average value of from 1 to 10;
 n has an average value of from 1 to 10;
 Y is a hydrophilic group; and
 x is a cation, preferably monovalent.

Compounds which comply with the above formulas will be referred to herein as "compound (a)".

Y is a suitable hydrophilic group or substituted hydrophlilic group such as, for example, the sulfate, sulfonate, phosphate or carboxylate radical. Preferably, $R_1$ is a branched alkyl radical having at least two branching groups and Y is a sulfate or sulfonate group. Where Y is a sulfonate group, the preferred structure of Y may be characterized by the following general formula:

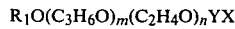

wherein
 $R_2$ is an alkyl, cycloalkyl, alkenyl, alkylaryl or aryl radical containing up to 8 carbon atoms; and
 $R_3$ is a hydrogen atom, a hydroxyl radical, or an aliphatic radical containing from 1–8 carbon atoms.

It should be understood that the surfactant of the present invention is not a pure substance in the strict sense, but really a mixture of components distributed such that m and n are the resulting average values.

Surfactants of the general formula of compound (a) can be prepared in a number of ways. For the sake of brevity and clarity, however, only the preferred method of preparation will be presented herein.

Suitable precursors of compound (a) include a $C_{6-24}$ linear or branched alcohol, a $C_{6-24}$ methyl phenol, or a $C_{6-24}$ dimethyl phenol. Preferably, the precursor is a branched-chain alcohol having at least two branching groups. More preferably, the branched chain alcohol contains from 10 to 16 carbon atoms. The symbol $C_{6-24}$ is used herein to designate an alkyl radical having from 6 to 24 carbon atoms per molecule.

Any isomers or substituted derivatives of these precursors are suitable in the practice of this invention. However, the use of a branched chain alcohol having from 10 to 16 carbon atoms is especially preferred and results in improved salinity and multivalent cation tolerance.

The alcohol or substituted derivatives is reacted with propylene oxide (PO) to yield an alkyl oxypropylene ether or an alkyl phenyl oxypropylene ether. The average number of propylene oxide units (i.e., the value of m) can be varired as desired up to about 10, except that at least one propoxy unit must be added. Preferably, m ranges from a value of about 2 to a value of about 6.

The resulting oxypropylene ether is then reacted with ethylene oxide (EO) to yield an alkyl oxypropylene oxyethylene ether or an alkyl phenyl oxypropylene oxyethylene ether. The average numer of ethylene oxide units added (i.e., the value of n) can be varied between about 1 and about 10. Preferably, however, n ranges between about 2 and about 6.

Methods of alkoxylation are well known to those skilled in the art. The alkoxylation reaction can be achieved using a strong base or Lewis acid catalyst such as NaOH, KOH, $BF_3$ or $SnCl_2$. Examples of other suitable bases include sodium phenolate and alkali metal alkoxides such as sodium methoxide or propoxide. Other suitable acids include $BF_3$-etherate, p-toluene sulfonic acid, fluorosulfonic acid, aluminum butyrate and perchloric acid. The following example will serve to illustrate an alkoxylation procedure.

EXAMPLE 1

A total of 453 g (2.27 moles) of i-tridecyl alcohol and 6 g of dry sodium hydroxide was charged to a 2-liter stirred autoclave reactor. The reactor was purged with nitrogen and heated to approximately 140° C. Four hundred grams of propylene oxide (6.90 moles) were delivered to the reactor over a period of about an hour. The reaction temperature was increased to about 160° C. until reactor pressure dropped to a constant value. The reaction mixture was then cooled to about 140° C., after which 399 g of ethylene oxide (9.07 moles) were delivered to the reactor over about a one-half hour period. The reaction temperature was again raised to about 160° C. and maintained until the pressure dropped to a constant value. After cooling, approximately 1200 g of product were withdrawn and filtered through a sand bed to remove sodium hydroxide particles. Dissolved water was removed by distillation. Analysis of the product indicated that an average of three propoxy groups and four ethoxy groups were added to the i-tridecyl alcohol precursor.

To the resulting propoxylated/ethoxylated material can then be added a suitable hydrophilic group (Y). The choice of hydrophilic group depends on availability, expense, the degree of surface activity, and hydrolytic stability imparted to the resulting surfactant. Using these criteria, suitable groups include the sulfate group, the sulfonate group, the phosphate group and the carboxylate group. In particular, we have found that the incorporation of the sulfate or sulfonate groups into surfactants of the present invention results in improved brine tolerance. Preferably, therefore, the hydrophilic group is sulfate or sulfonate.

The following example will serve to illustrate the preferred sulfation procedure.

EXAMPLE 2

The product from Example 1 was added to a wiped film reactor at a rate of about 12 g (0.0214 g-moles) per minute. Sulfur trioxide, diluted in a stream of dry nitrogen, was then introduced at a rate of 2.0 g (0.0250 g-moles) per minute. The sulfate acid product was collected continuously at the outlet of the reactor. The resulting product was then neutralized with fifty weight percent sodium hydroxide solution to give a surfactant of composition i-$C_{13}$ $H_{27}O(C_3H_6O)_3$ $(C_2H_4O)_4$-$SO_3^-Na^+$.

While a large number of suitable alkoxylated compounds may be prepared, each must be prepared by a method which introduces propoxy groups first and ethoxy groups second.

Alternatively, the sulfation step can be omitted and the resulting propoxylated ethoxylated composition may be reacted with any suitable alkali metal (including, for example, sodium, potassium, or lithium) as the next step to form a sulfonate surfactant. The reaction product will be referred to herein as a metal etherate for the sake of brevity.

Thus, to form the sulfonate surfactant, the metal etherate can be reacted with a large number of compounds to yield surfactants generally characterized by compound (a). For example, the metal etherate may be reacted with chloromethyl sulfonate, vinyl sulfonate, 1,3-propane sultone, or 1,4-butane sultone to prepare compounds having a general structure where $R_3$ is a hydrogen atom. The metal etherate may also be reacted with 3-methylpropane sultone, or 4-methylbutane sultone, to prepare compounds having a structural formula where $R_3$ is a methyl group. The metal etherate also may be reacted with hydroxyvinyl sulfonate, 3-hydroxypropane sultone, or 4-hydroxybutane sultone to prepare compounds having a structure where $R_3$ is a hydroxyl group.

The sultones used for the sulfonation of the metal etherate are cyclic esters of hydroxysulfonic acids. The name sultone is derived from their formal resemblance to lactones. Considerable literature has been devoted to sultones and the chemistry of the propane and butane sultones in well known to the art. See, for example, R. F. Fisher, *Industrial and Engineering Chemistry*, Vol. 56 No. 3, March 1964, pp. 41–45.

Alternatively, the propoxylated ethoxylated material can be reacted with phosphorous pentoxide to form a phosphate. If desired, a catalyst such as $BF_3$-etherate complex may be used. The resulting product is then neutralized with an alkali metal base such as sodium or potassium hydroxide, or sodium or potassium carbonate, or the like, to form an alkali metal salt.

Alternatively, a carboxylate group may be incorporated into the propoxylated ethoxylated material by any number of well-known methods. For example, the propoxylated ethoxylated material may be reacted with a halogen carboxylic acid to result in a carboxylic acid. Alternatively, the alcoholic end group—$CH_2OH$ can simply be oxidized under well-known conditions to yield a carboxylic acid. The resulting product is then neutralized using an alkali metal base to form a carboxylate surfactant having the general formula of compound (a).

The techniques of alkylation, propoxylation, ethoxylation, sulfation, sulfonation, phosphation and carboxylation which are used to prepare the various surfactant embodiments of this invention are generally well-known in the art. Accordingly, the preparation of the surfactants of this invention will not be exemplified further since the techniques for production are well-known.

The reservoir temperature, the crude oil in the reservoir and the salinity of the fluid to be used for flooding operations will dictate the preferred forms of compound (a). Although it has been found, in general, that the incorporation into the surfactant of propoxy groups and ethoxy groups in the order described above results in a mixture of compounds, a great many of which have surface active properties that are much less sensitive to salinity and to the presence of multivalent cations, there still exist preferred combinations of propoxy groups and ethoxy groups for given concentrations of inorganic salts. That is, for a given brine there exists an optimum family of surfactants defined by a set of pairs $\{(m, n)\}$, of average values m and n.

The drawing illustrates this feature. It was prepared from experimental data using brines composed of various percentages of a formation brine (specifically Tar Springs Brine, hereinafter "TSB") having the composition shown in Table I.

TABLE I

| Composition of Tar Springs Brine | |
|---|---|
| Component | Concentration (g/l.) |
| NaCl | 91.71 |
| $CaCl_2$ | 7.86 |
| $MgCl_2 \cdot 6H_2O$ | 10.33 |
| $BaCl_2 \cdot 2H_2O$ | 0.133 |
| $NaHCO_3$ | 0.195 |

In the drawing, the contour labelled 1.0 corresponds to 100% TSB and has a brine composition identical to that shown in TABLE I. The contour labelled 1.5 has 50% more of each component listed in TABLE I than does TSB, and so on.

Thus where the the flooding fluid has a concentration of inorganic salts on the order of 110% TSB, it has been found that for an i-tridecyl propoxylated ethoxylated sulfate surfactant an optimum pair is three propoxy groups and two ethoxy groups (m=3 and n=2); another optimum pair is m=4 and n=3; still another is m=6 and n=4, and so on. Conversely stated, for a given family of surfactants defined by {(m, n)}, there exists an optimum brine composition (e.g. optimal salinity) for best results.

It can also be noted that, for the surfactant under consideration, the curves defining the optimum ratio are not always linear. Further, there is a region for simultaneously low m and n values that defines surfactants which, if used, given undesirable gels. For an i-tridecyl alcohol precursor, it has been found, for instance, that the sum of m and n should preferably be greater than about two. The delineating summation value may, however, vary depending on the nature, chain length, or branching of the substrate which is alkoxylated, on the temperature, the nature of the oil, the type and amount of co-surfactant or co-solvent (if any), and the quantity and type of unreacted alcohol and alkoxylates.

It can further be noticed that for low values of m and especially for m=0 (implying an ethoxylated-only surfactant), optimal salinity is extremely sensitive to a change of only one mole of ethylene oxide, i.e. for $\Delta n = \pm 1$. Thus, referring to the drawing, when m=0 and n=3, decreasing the degree of ethoxylation by one ($\Delta n = -1$) results in a change in optimal salinity of 40% TSB. By comparison, when m=3 and n=3, increasing or decreasing the average degree of ethoxylation by one results in a change in optimal salinity of only $\pm 15\%$ TSB, respectively. Similarly, increasing or decreasing the average degree of propoxylation by one results in a change in optimal salinity of only about $\pm 20\%$ TSB, respectively. Thus, for ethoxylated-only surfactants, the change in optimal salinity is at least 2 times greater than the change seen for the propoxylated-ethoxylated surfactants. It follows that the salt sensitivity of the component species in the ethoxylated-only surfactants is much greater than that of surfactants prepared through propoxylation followed by ethoxylation.

Various compounds having a general formula as characterized by compound (a) can be used in the practice of this invention. Examples of suitable surfactants may include compounds wherein $R_1$ is the i-tridecyl group, i-hexadecyl group, i-decyl group, or i-dodecyl benzene, toluene or xylene group; $R_2$ may be a methyl, ethyl, propyl, butyl, cyclopentyl, cyclohexyl, or benzene radical (in the case of a sultone); $R_3$ can be a hydrogen atom, a methyl, ethyl, propyl, ethanyl, propenyl, or hydroxyl radical. It is contemplated that when $R_1$ contains an aromatic group, the group will be a single benzene radical which will always be alkyl or alkenyl substituted.

X can include alkali metals such as sodium, potassium and lithium, alkaline earth metals such as calcium and barium, amines including alkanol amines and their oxyalkylated adducts, and ammonium. Many other examples of $R_1$, $R_2$, $R_3$ and X will be apparent to those skilled in the art, and the specific examples listed should not be construed as limiting.

To further illustrate how the surface-active agents disclosed herein achieve the benefits of this invention it may be helpful to generally discuss the structure of a surfactant and the surfactants of this invention in particular. Most conventional surfactant molecules have an amphiphilic structure; that is, the molecules are composed of groups which have opposite solubility tendencies. For use in oil recovery operations the molecules should have at least one predominantly lipophilic or oil-soluble group and at least one predominantly hydrophilic or water-soluble group. These are present in a certain ratio or balance. Where the correct balance is achieved, the surfactant will be able to solubilize relatively large amounts of both oil and water at or near optimal salinity. Such balanced surfactants are highly surface active and have been found very effective for oil recovery.

This desired balance can be achieved much more accurately with surfactants formulated in accordance with this invention than with other conventional surfactants because of the presence of propoxy groups between the ethoxy groups and the lipophilic group ($R_1$). While not wishing to be bound by theory, the benefit of the present invention may be explained as follows. Ethylene oxide (EO) chains interact very strongly with water, so that deletion or insertion of a single EO group vastly changes the surface activity of the molecule in a given brine environment, as noted previously. However, propylene oxide chains interact less strongly with water, thus reducing the overall hydrophile-water interaction and hence, as noted previously, reducing the impact on optimal salinity of a change of one ethoxy or propoxy group. In summary then, an important feature of surfactants of the present invention is that the presence of the propoxy groups between the lipophilic group and the ethoxy chain/hydrophilic group (Y) modifies the overall hydrophile-water interaction energy, thus permitting accurate design of surfactants having the desired balance. Hence, such surfactants exhibit a large capacity for oil-water solubilization, high surface activity, decreased sensitivity to brine, and good oil recovery.

Surface-active agents in accordance with this invention can be formulated which exhibit this desired oil-water solubilization for use in the adverse environments of high-temperature reservoirs and/or high salt concentration environments. In addition, a large number of the component compounds of the surfactant used will exhibit similar or equivalent surface active properties for a given formation brine thereby substantially diminishing the problems ordinarily associated with chromatographic separation during flooding operations. While separation still occurs, as with other surfactants, a large number of the components still give acceptable surface activities under reservoir conditions, significantly enhancing recovery. As pointed out in the following discussion, such compounds can be formulated by propoxylating and ethoxylating the lipophilic group in a specific order; the properties of a surfactant may further be varied by adjusting the relative size and character of the hydrophilic or lipophilic portion of the surface-active molecule.

Generally, the oil solubility of surfactants is related to the molecular weight of the lipophilic (oil-soluble) portion of the molecule. Since a surfactant's affinity for water generally increases faster than its affinity for oil as temperature increases, the ability to increase a surfactant's oil solubility can be very important. The surfactants of this invention, characterized by compound (a), can be designed to take into account adverse temperature effects by choosing $R_1$ of a suitable molecular weight to exhibit a desired oil solubility for a particular reservoir temperature.

Moreover, it has been discovered that the surface activity of surfactants of the present invention may be further enhanced by using a branched chain alkyl lipophilic portion.

The hydrophilic portion of the family of surface-active agents characterized by this invention can be adjusted to increase the agents' water solubility. The preferred sulfate or sulfonate radical is one portion of the surface-active agent which gives the molecule some hydrophilicity. Typically, sulfated and sulfonated surfactants tend to exhibit a relatively high degree of water solubility. However, if a surfactant must rely only on the sulfate or sulfonate radical for its hydrophilicity, the surfactant's solubility in brine will decrease as water salinity increases. It is well known that an ethoxy group positioned between the lipophilic group and the hydrophilic group will increase the surfactants' solubility in water; moreover, it is also known that increasing the number of ethoxy groups will increase the surfactants' water solubility.

It has also been found, however, that the optimum surface-active properties of an ethoxylated-only surfactant in a medium containing inorganic salts are highly dependent on the number of ethoxy groups contained in a molecule. Thus, suppose an ethoxylated-only surfactant was required that would be effective in a brine containing salts equivalent to those in 190% TSB. The formula for one such surfactant is $C_{13}H_{27}O(EO)_{2.5}SO_3^-Na^+$, where 2.5 is the average number of ethylene oxide groups. However, this surfactant is a mixture of several pure component surfactants having the formulae $C_{13}H_{27}O(EO)_nSO_3^-Na^+$, where n=0, 1, 2, 3, 4, . . . and so on. The amounts of each of these pure components varies in such a way that their mole-average is 2.5. In test-tube experiments designed to estimate surface activity in terms of capability to solubilize water and oil, it is found that this mixture is quite effective for reducing interfacial tension in an environment containing salts in concentrations approximately equivalent to those in 190% TSB. However, in long-core flooding experiments or in field applications, the various pure-component surfactants are subject to chromatographic separation and none of the separated surfactants exhibits acceptable surface activity in the resident brine. Instead, for example, $C_{13}H_{27}O(EO)_2SO_3^-Na^+$ is effective only near 170% TSB and $C_{13}H_{27}O(EO)_3SO_3^-Na^+$ is effective only near 210% TSB.

Surprisingly, it has been found as a feature of this invention that when a certain number of propoxy groups are incorporated adjacent the lipophilic portion of the molecule, followed by ethoxy groups, the surface-active properties of the resulting surfactant (actually a mixture of compounds) are less sensitive to salinity or higher concentrations of multivalent cations. That is, many of the discrete compounds that comprise the surfactant mixture demonstrate similar surface active properties. This means that the inorganic salt concentrations of the flooding fluid can be adjusted to match that of the formation; if chromatographic-type separation of component compounds occurs, effective reduction of oil-water interfacial tension still takes place. As a corollary, variations in salt concentrations within the formation, e.g. due to mixing or concentration inhomogeneities, do not affect surfactant performance to the extent experienced with surfactants used previously.

As mentioned previously, the surfactant system may be further optimized by choosing the specific appropriate propylene oxide and ethylene oxide combination. This simply means that a choice is made as to the component compounds which predominate in the distribution of compounds which comprises the surfactant. Thus, it has been found that, at a given temperature and for a given crude oil, an optimum combination of propoxy and ethoxy groups in a surfactant exists for various salt concentrations. A family of curves defining this relationship can be derived (for example, the optimal salinity map of the drawing). This family of curves may be used in determining the best surfactants (i.e. set {(m, n)}) for a given salt concentration for a particular formation and crude oil.

Whether a sulfate, sulfonate, phosphate, or carboxylate type surfactant should be used and the relative hydrophilic-lipophilic balance which will be most effective and efficient in recovering oil will depend to a large extent on the physical and chemical characteristics of a particular formation. As mentioned previously, sulfates and sulfonate-type surfactants have been found to be effective in general, and are therefore preferred. Moreover, use of a $C_{10-16}$ branched alcohol as the alkoxylation precursor is also preferred, since a good hydrophilic-lipophilic balance has been found to be achieved thereby.

The surface-active agents of this invention can be used in any flooding process where a surfactant is introduced into a formation for the purpose of recovering crude oil. Accordingly, the process of the present invention finds application in aqueous surfactant solutions. Still further, the surface active agents may be used in liquid hydrocarbon solution in those recovery techniques in which an oil solvent is employed to provide a miscible displacement of the crude oil within the formation. The surfactants also have special applicability in "microemulsions."

The expression "microemulsion" as used herein is defined as a stable, transparent or translucent micellar solution of oil, water, and one or more surfactants. The solution may optionally contain co-surfactants and/or cosolvents. These microemulsions may be water-external, oil-external, or may fall into that class of micellar structures in which there is apparently no identifiable external phase. The microemulsions may be single-phase solutions which can take up additional quantities of oil or water without phase separation. The microemulsions may be immiscible with oil, water, or both.

An effective microemulsion for an oil recovery process must sufficiently displace oil, and in turn the microemulsion must be effectively displaced by any water which drives it through the formation. To satisfy these criteria both the microemulsion-oil and microemulsion-water interfacial tensions must be low when phase separation occurs.

The microemulsion for use in a specific application is designed by first ascertaining information concerning the oil-bearing formation from which oil is to be recovered. The oil from the formation is analyzed to determine its physical and chemical characteristics. Similarly, water from the formation is analyzed to determine the quantity and type of ionic substances present. The formation temperature is also determined by conventional means.

Microemulsions are then formulated on the basis of the information obtained from the subterranean formation. It is preferred that the oil be one which has physical and chemical characteristics approximating the characteristics of the crude oil of the subterranean formation. The aqueous medium employed in the formation of the microemulsion of the present invention can be pure water, but is preferably a brine. The best salt concentrations for any particular microemulsion system will depend, among other criteria, on the salt concentrations of the formation brine. Therefore, most preferably formation brine, or an aqueous medium having similar physical and chemical characteristics thereto, is employed.

The third essential component of the microemulsion of the present invention is a surfactant having a formula as characterized by this invention. A suitable surfactant is i-tridecyl ether $(PO)_m (EO)_n$ sulfate, wherein the values of m and n preferably are selected using guidance from the drawing for a given salt concentration to further optimize the surface-active properties of the surfactant for a particular reservoir. Thus, for use in displacing at 74° F. a crude oil having properties similar to diesel fuel in a formation containing the approximate equivalent of 110% TSB, a particularly suitable surfactant is i-$C_{13}H_{27}O(PO)_4(EO)_3SO_3{}^-Na^+$. It must be emphasized at this point that similar information cannot be obtained from the drawing for a different temperature, crude or qualitatively different brine. Rather, the drawing must be appropriately reconstructed.

In preparing the microemulsions of the present invention, the proportions of oil, water, and surfactant are not particularly critical as long as the same are sufficient to provide a microemulsion. Accordingly, the amount of water and the amount of oil can vary within wide limits. It is noted, however, that it has been discovered that the method of the present invention is applicable to the use of both water-external microemulsions and oil-external microemulsions as well as those micellar structures in which no particular external phase is discernible. Therefore, in the microemulsions of this invention, it is sufficient that the surfactant be employed in an amount effective to produce the desired microemulsion. For most purposes, the surfactant is employed in an amount from about 1% to about 20% based upon the volume of the microemulsion, and preferably between about 2% and about 12%. Usually, the lowest concentration possible is utilized so that a correspondingly large bank size can be used to compensate for deleterious effects of reservoir heterogeneity, and the upper limits are based upon economic considerations.

As indicated previously, the microemulsion can contain one or more co-surfactants and/or co-solvents. The co-surfactants or co-solvents can be employed, for example, to adjust the viscosity of the microemulsion. Generally, the co-solvent is employed in an amount of from about 0.1% to about 10% based upon the volume of the microemulsion. Many surface-active materials having a lipophilic portion can be effectively utilized as a co-surfactant or co-solvent in the environment of the present invention. The co-surfactants or co-solvent which have been found to be particularly effective include, but are not limited to, alcohols, ethoxylated alcohols, sulfated ethoxylated alcohols, sulfonated ethoxylated alcohols, ethoxylated phenols, sulfated ethoxylated phenols, and synthetic sulfonates. The alcohols which are used as co-solvents are generally $C_{3-20}$ aliphatic alcohols including, for example, isopropanol, isobutanol, t-butanol, and various amyl alcohols, 1 and 2-hexanols, 1 and 2-octanols and dodecanol.

Although co-surfactants and co-solvents can sometimes be used to advantage, it is a noteworthy and significant feature of the surfactants of this invention that such co-surfactants or co-solvents are often not required. This is thought to be a consequence of the complex nature of these surfactants inasmuch as many values of m and n are represented. Hence, a whole range of co-surfactants and co-solvents is already "built-in."

In addition to the above, the fluids containing the surfactants of the present invention (e.g. microemulsions, flooding water, brines, etc.) can optionally include a thickener for mobility control. Typical thickeners include water-soluble polymers including polysaccharides, such as those sold under the tradename "Kelzan XC" by Kelco Corporation; another typical example is Biopolymer 1035 sold by Pfizer, Inc. Other thickeners include high molecular weight polyacrylamides and acrylamide copolymers, more specifically, for example, partially hydrolyzed polyacrylamides such as those sold under the tradename "Pusher" by Dow Chemical Company. Another specific example of a suitable thickener is the improved biopolymer of U.S. Pat. No. 4,182,860 (Naslund, et al.). The thickeners are employed in the microemulsion in an amount sufficient to create a favorable mobility ratio between the microemulsion and the fluids being displaced by the microemulsion.

Further, it has been found that an additional and important advantage of surfactants of the present invention is that they exhibit good compatability characteristics with such mobility control agents. Many known surfactants cannot be utilized with such agents because of various incompatibility problems, such as coprecipitation or loss of surface activity.

Microemulsions for injection into a formation and which use surfactants of the present invention are further illustrated by the following Table II, wherein all components are reported as volume percents based on the total microemulsion volume, except that inorganic salts are reported in g/l.

TABLE II

Typical Formulations of Microemulsions for Injection

| Component | Percent Ranges | |
|---|---|---|
| | General | Preferred |
| Oil | 0.25–90% | 0.25–15% |
| Water | 1–95% | 80–95% |
| Surfactant | 1–20% | 2–12% |
| Inorganic Salts | 0–250 g/l | equivalent to reservoir brine |
| Co-surfactant | 0–15% | 0% |
| Thickener | 0–2% | 0% |

The surfactant used in formulations prepared according to Table II are generally characterized by compound "a" and the particular compound used will be governed by the principles discussed previously and, more specifically, by the concentration of inorganic salts in the formation brine. In particular, the average values of m and n will be determined by the inorganic salt content. Most preferably, the concentration of inorganic salts will be substantially equivalent to that of the formation brine of the reservoir being flooded.

In practice, the microemulsion is first injected into the subterranean formation in the form of a slug followed by the injection of thickened water and thereafter unthickened water. The slug of microemulsion is injected into the subterranean formation in a quantity selected to be large enough to effectively displace the crude oil in the formation to one or more production wells. Those skilled in the art can determine the volume to be injected. The thickened water which is injected after the slug of microemulsion can be any conventional thickened water used as a driving fluid in microemulsion flooding processes. Following the injection of thickened water, unthickened water is injected as a flooding medium. Any of these fluids can contain the surfactants of the present invention.

The thickened and unthickened water act as driving fluids to drive the microemulsion slug through the subterranean formation and the microemulsion slug displaces crude oil trapped therein. The displaced oil is driven to the production means and then to the surface of the earth.

COMPARATIVE TESTS

The invention is further illustrated by the following tests which were performed to determine the surface active properties of surfactants of the present invention. Similar tests were performed using surfactants wherein the precursor has been (a) ethoxylated-only; (b) propoxylated-only; and (c) ethoxylated and then propoxylated.

The experimental conditions and results are presented in Table III. In comparing results, three types of values will be focused upon: (a) solubilization parameters for oil in microemulsion, volume ratio of oil to surfactant in microemulsion phase ($V_o/V_s$); (b) optimal salinities for phase behavior, percent TSB ($C_\phi$); and (c) final oil saturations, dimensionless ($S_{of}$). The conditions and microemulsion compositions for core flooding experiments to obtain $S_{of}$ values are reported in Table III and Example 4 following. The procedure of Example 3 following was used to determine solubilization parameters and optimal salinities.

The solubilization parameter, $V_o/V_s$, has been found to provide a good indication of surface activity. The higher the solubilization parameter, the lower the interfacial tension will be between the microemulsion and the oil after phase separation occurs. Therefore, it is desirable to have high $V_o/V_s$ values.

The optimal salinity, $C_\phi$, for a given surfactant approximately equals that concentration of inorganic salts in the microemulsion at which a low interfacial tension exists for both the microemulsion-oil interface and the microemulsion-water interface. Thus, it represents an optimum balance of acceptably low interfacial tensions. It will be noted that the data from Table III for $C_\phi$ versus m and n do not always exactly fall on the appropriate curve from the family of iso-$C_\phi$ curves shown in the drawing. The reason for this is that uncertainty in the data requires the use of an averaging procedure in determining the best location for each curve.

Balanced, low interfacial tensions are important since this means that, on the one hand, the microemulsion can effectively displace oil from the formation and, on the other hand, the microemulsion itself can be displaced by driving fluid (e.g. thickened water). In the drawing, $C_\phi$ is expressed as percent Tar Springs Brine (TSB), previously defined in Table I. This brine contained approximately 104,000 ppm total dissolved solids (TDS), of which $Na^+$ and $Cl^-$ ions accounted for about 100,000 ppm. The remaining 4,000 ppm of TDS were accounted for by $Ca^{++}$ and $Mg^{++}$ ions and other trace substances.

The final oil saturation, $S_{of}$, indicates the ultimate amount of residual oil in the formation after the flooding process has been completed.

TABLE III

Experimental Conditions and Results
i-$C_{13}H_{27}O(PO)_m(EO)_nSO_3^-Na^+$

| Label | Surfactant m (Ave) | n (Ave) | Sol. Para. $V_o/V_s$ | Opt. Sal. $C_\phi$ (% TSB) | Final Oil Sat $S_{of}$ (% PV)[1] | Initial Oil Sat $S_{or}$ (% PV) | Injection Composition (% Surf.) | Diesel Oil % | Brine (% TSB) | Brine in Core (% TSB) | Oil in Core | Surfactant Injected $C_{sx}PV_b$[2] | Drive-Water Salinity (% TSB) | Polymer Conc. in Dr. Water (ppm) |
|---|---|---|---|---|---|---|---|---|---|---|---|---|---|---|
| A | 2 | 1 | 15 | 120 | 17.3 | 34.9 | 2.5 of A | 2.0 | 95.5 | 100 | Loudon | 51.4 | 70 | 750 |
| B | 3.3 | 2 | 14 | 100 | 10.8 | 33.6 | 2.5 of B | 2.0 | 95.5 | 100 | Loudon | 50 | 70 | 750 |
| C | 3 | 3.2 | 16 | 135 | 20.6 | 34.2 | 2.5 of C | 2.0 | 95.5 | 100 | Loudon | 50 | 70 | 750 |
| D | 4 | 3 | 14 | 107 | 10.8 | 34.9 | 2.5 of D | 2.0 | 95.5 | 100 | Loudon | 50 | 70 | 750 |
| E | 5.05 | 3 | 16 | 96 | 12.8 | 35.5 | 2.5 of E | 2.0 | 95.5 | 100 | Loudon | 50 | 70 | 750 |
| F | 2 | 0 | Gel | — | No floods run | | | | | | | | | |
| G | 3 | 0 | 11 | 103 | 16.0 | 35.5 | 2.5 of G | 2.0 | 95.5 | 100 | Loudon | 50 | 70 | 750 |
| H | 4 | 0 | 9.5 | 94 | 13.9 | 37.1 | 2.5 of H | 2.0 | 95.5 | 100 | Loudon | 50 | 60 | 750 |
| I | 0 | 2 | 12 | 170 | 14.0 | 31.0 | 2.5 of I | 2.0 | 95.5 of 189% TSB | 180 | Diesel | 58 | 80 | 2,000 |
| J | 0 | 3 | — | 210 | No floods run | | | | | | | | | |
| K | 0 | 1 | Gel | — | No floods run | | | | | | | | | |
| L | 0 | 2 | — | 155 | No floods run | | | | | | | | | |
| M | 0 | 3 | — | 195 | No floods run | | | | | | | | | |
| N | 0 | 4 | — | >220 | No floods run | | | | | | | | | |
| O | 4 | 1.5 | — | (94)[3] | No floods run | | | | | | | | | |
| P | 3 | 4 | — | (143)[3] | No floods run | | | | | | | | | |
| Q | 3.51 | 2.72 | — | (112)[3] | 10.6 | 34.6 | 2.5 of 50/50 J/K | 1.0 | 96.5% | 100 | Loudon | 50 | 80 | 1,000 |
| R | 4.2 | 2 | 3.5 | 135 | 20.7 | 35.9 | 2.5 of M | 2.0 | 95% of 135% TSB | 135 | Loudon | 50 | 100 | 750 |
| S | 3.7 | 2.5 | 3.0 | 175 | No floods run | | | | | | | | | |
| T | 2.9 | 4 | 2.5 | >200 | No floods run | | | | | | | | | | i-$C_{13}H_{27}O(EO)_n(PO)_mSO_3^-Na^+$

[1] After injection of 1.3 pore volumes (PV) of microemulsion.
[2] Concentration of surfactant ($C_s$) times injected bank pore volume ($PV_b$), the resulting value indicating the quantity of surfactant used.
[3] Data not measured, but extrapolated from the drawing.

Example 3 following will illustrate the preparation of various microemulsion systems for determining $C_\phi$ and solubilization parameters, and Example 4 will illustrate the core flooding tests. It should be understood that the invention is in no way limited to these examples. In the examples, brine, surfactant and oil concentrations are presented as percent by volume.

EXAMPLE 3

Microemulsion compositions for determining $C_\phi$ and $V_o/V_s$ reported in Table III were prepared by mixing equal volumes of water containing varying proportions of dissolved solids (related to the TDS of the formation brine from the field) and a diesel oil. The oil used approximated the physical and chemical characteristics of a particular formation crude oil (Loudon crude).

The surfactants added to the solutions all utilized an alkoxylated i-tridecyl alcohol substrate. The alkoxylated i-tridecyl alcohols had then been sulfated and neutralized as described previously. The surfactant concentration in all cases was about 1% by volume. These mixtures were agitated to permit thorough mixing and then permitted to stand for phase separation. The volume of oil and volume of water taken up by each microemulsion was measured, and the volumetric ratio of oil to surfactant ($V_o/V_s$) was calculated. The volumetric ratio of water to surfactant ($V_w/V_s$) was also determined.

The solubilization parameters ($V_o/V_s$ and $V_w/V_s$) for each microemulsion system were determined by varying the salinity of the aqueous phase in the microemulsion. By plotting the resulting parameter values versus salinity, their intersection determines the optimal salinity ($C_\phi$).

A more complete description of the testing methods used herein to obtain the various experimental values is given in U.S. Pat. No. 3,981,361 (issued to R. N. Healy on Sept. 21, 1976). Further background information may be found in "A Laboratory Study of Microemulsion Flooding," R. N. Healy, R. L. Reed, and C. W. Carpenter, Jr., *Society of Petroleum Engineers Journal*, Feb. 1975, pp. 87–103; also in "Multiphase Microemulsion Systems", R. N. Healy, R. L. Reed, and D. G. Stenmark, *Society of Petroleum Engineers Journal*, June 1976, pp. 147–160.

Various microemulsions were then prepared having compositions as defined in Table III and were subjected to core displacement tests using slugs of each microemulsion driven by thickened water having a salinity of about 70% TSB. In general, each microemulsion tested had been prepared at or near its optimal salinity for the particular surfactant and oil used in the microemulsion. The only microemulsions of Table III which were not formulated under optimal salinity conditions for displacement tests were for materials A, C and I.

Example 4 is presented to illustrate the procedure followed in core displacement tests of the various microemulsions listed in Table III.

EXAMPLE 4

The selected microemulsion was injected into a Berea sandstone core to determine the efficiency of an oil recovery process. The core used in these tests was a section of Berea sandstone having a cross-section of 1 inch by 1 inch and a length of 24 inches. Each test core had a permeability to brine of approximately 400 millidarcies and was mounted in epoxy with tap-fittings at each end for injection and production of fluids.

Prior to conducting the displacement test, the cores were flooded with oil and brine to approximate the oil and water saturations that would exist in an oil reservoir which had been flooded to the point that no further oil could be produced. In this flooding operation, the core was first saturated with a brine solution having 104,000 ppm TDS of the composition described previously (TSB). The core was then flooded with a 32°-34° API gravity oil from the Loudon Field in Illinois, until no further brine could be produced. The core was then once again flooded with brine to remove all of the oil which could be recovered by a conventional waterflooding process. At this point, the quantities of oil and water remaining in the cores approximated those in a reservoir which had been water-flooded to a residual oil saturation. The residual oil in this core was approximately 35% of the pore volume of the core; the remaining 65% was saturated with brine. Precise values are listed in Table III.

After the core had been water-flooded to a residual oil saturation, the following displacement test was conducted in the core. A microemulsion solution having a composition listed in Table III was injected into the water-flooded core. Injection of this microemulsion solution was continued until approximately 0.2 pore volumes of fluid had been injected. The microemulsion solution was followed by a brine solution containing about 750 ppm of a biopolymer thickening agent in 70% TSB until oil production ceased. The viscosity of this brine solution was about 12 centipoises. These fluids were injected at an average frontal velocity of approximately one foot per day. The final oil saturation was obtained by measuring the incremental oil recovery.

Comparison of the results reported in Table III illustrates the advantages of surfactants of the present invention. In comparing results, it should be mentioned that surfactants K-M are single component surfactants (i.e. surfactants which have been purified extensively to yield a single species). The remaining surfactant materials are distributions of compounds, as discussed previously.

Comparison of $V_o/V_s$ Values

From Table III it can be seen that, where available, the solubilization parameters ($V_o/V_s$) for the propoxylated ethoxylated material (surfactants A-E O-Q) are uniformly high. Values of about 15 are considered to be very good. By contrast, the values for surfactants which contain only propoxy groups (surfactants F-H) do not demonstrate the same high $V_o/V_s$. In fact, surfactant F does not even produce a fluid microemulsion, but instead gives a gel. This indicates that the propoxylated ethoxylated material would be expected to give much lower overall interfacial tensions than the propoxylated-only material.

An even more substantial difference is seen in comparing the propoxylated ethoxylated material with the reverse-ordered ethoxylated propoxylated material. (See Table III, surfactants R-T). The solubilization parameters for the reverse-ordered materials are extremely low and indicate that unacceptably high interfacial tensions would result.

While the $V_o/V_s$ value available for the ethoxylated-only material (surfactants I-N) indicates that the m=0, n=2 species might be acceptable, comparison of optimal salinities ($C_\phi$) indicates that the use of these surfactants in field flooding would present significant problems with chromatographic-type separation in the formation.

Comparison of $C_\phi$ Values

The $C_\phi$ values for the ethoxylated-only materials (surfactants I-N) demonstrate the potential problems for field operations. At one end of the scale, surfactant K (with only one ethoxy group) gives a gel. Each time an ethoxy group is added (surfactants I and J, and L-N), a large jump in optimal salinity results. Thus, a change of one ethoxy group in moving from surfactant I to surfactant J, causes a jump in optimal salinity of about 45%. [By contrast, a change of two alkoxy groups between surfactants A and B (one propoxy and one ethoxy group) causes a drop in optimal salinity of only 20%.] The large jumps in $C_\phi$ values for ethoxylated-only materials foreshadow severe problems in the formation as the various components separate and are subjected to formation brine having concentrations of inorganic salts which are not optimum for the separated components. Thus, one discrete component may precipitate when existing separately in the formation brine, while another may form a gel under these conditions and a third may exhibit totally inadequate surface active properties.

Moreover, while the ethoxylated-only material $C_\phi$ values range from no optimal value (gel) to greater than 220% over a relatively narrow range of ethoxy groups, the propoxylated-ethoxylated material $C_\phi$ values range from 96% to 135% TDS over a very broad range of m and n values. This further illustrates why many of the components of surfactants of the present invention may be separated during flooding, and yet still retain good surface activity in reservoir brine.

An advantage of surfactants of the subject invention is further illustrated by reference to the drawing where all currently available data (for similar conditions) on optimal salinities of surfactants which are ethoxylated-only (m=0), propoxylated-only (n=0), and propoxylated and then ethoxylated (all of the form i-$C_{13}H_{27}O(PO)_m(EO)_nSO_3^-Na^+$ for m, n=0, 1, 2, 3, 4, 5, 6) have been plotted. The best smooth curves have been drawn through the data so as to make the iso-optimal salinity contours evident.

Suppose it is required to design a surfactant for use in preparation of a microemulsion to displace crude oil from a reservoir at 74° F. containing a crude having properties similar to the diesel oil used in obtaining the data of the drawing. Suppose further the resident brine salinity equivalent to 140% TSB. Then, as discussed previously, all surfactants lying on or close to the contour labelled 1.4 will be suitable candidates for such a microemulsion. Inspection of the drawing shows that there are no ethoxylated-only (m=0) surfactants that fall anywhere near the design contour.

Table IV summarizes possible surfactants and illustrates the extent that the various $C_\phi$ values deviate from that value desired (140% TSB). Listed therein are those ethoxylated-only surfactants that lie nearest the contour labelled 1.4 and also the values of a parameter $\Delta$. This parameter is the absolute value of the difference between the desired optimal salinity and the actual optimal salinity for the surfactant in question, expressed in % TSB. For ethoxylated-only surfactants, the smallest deviation shown is 30% TSB. Hence, Table IV illustrates that there are no ethoxylated-only surfactants clearly suitable for use in the above described reservoir.

Similarly, Table IV illustrates that there are no propoxylated-only (n=0) surfactants clearly suitable for use in this reservoir.

However, further inspection of Table IV shows that for the surfactants of this invention, which have been propoxylated first and then ethoxylated, there are a large number of candidates for preparation of a microemulsion suitable to recover oil from the above described reservoir.

In fact, suppose the surfactant i-$C_{13}H_{27}O(PO)_3(EO)_4$-$SO_3^-Na^+$ is selected. Then, among the many pure-component compounds that make up this complex mixture having an average value of m equal to 3 and an average value of n equal to 4, Table IV shows that there are at least 9 surfactants that have optimal salinities deviating from the design salinity of 140% TSB by no more than 10% TSB. There are at least 6 that deviate by no more than 2% TSB, and there is one that has exactly the correct value of optimal salinity so that its corresponding deviation is zero% TSB.

In addition to those compounds listed in Table IV under the heading "Propoxylated and Ethoxylated," there will be other suitable compounds having larger values of m and n than those shown and which exhibit good optimal salinities. In fact, extrapolation of the trend established in the drawing suggests that there are at least 14 different pure-component compounds of the structure taught by this invention that have optimal salinities that deviate no more than the equivalent of 11% TSB from the design salinity and that occur in significant mole-fractions within the mixture. This multiplicity of surfactants within the mixture that have high interfacial activity is further evidence of the advantages that accrue to a surfactant of the general formula of compound (a) in that there is great flexibility to meet design criteria by suitable adjustment of the average values of m and of n.

TABLE IV

| Comparison of $C_\phi$ Deviations* | | | | | | | | |
|---|---|---|---|---|---|---|---|---|
| Ethoxylated-Only | | | Propoxylated-Only | | | Propoxylated and Ethoxylated | | |
| m | n | Δ | m | n | Δ | m | n | Δ |
| 0 | 1 | Gel | 1 | 0 | Gel | 1 | 1 | 2 |
| 0 | 2 | 30 | 2 | 0 | 20 | 2 | 3 | 2 |
| 0 | 3 | 70 | 3 | 0 | 35 | 3 | 4 | 2 |
|   |   |   | 4 | 0 | 49 | 4 | 4 | 10 |
|   |   |   | 5 | 0 | 60 | 4 | 5 | 8 |
|   |   |   |   |   |   | 5 | 5 | 2 |
|   |   |   |   |   |   | 6 | 5 | 10 |
|   |   |   |   |   |   | 6 | 6 | 7 |
|   |   |   |   |   |   | 7 | 6 | 0 |

*$\Delta = |140 - C_\phi|$ where $C_\phi$ is the optimal salinity in % TSB for the surfactant having the stated values of m and n in the formula i-$C_{13}H_{27}O(PO)_m(EO)_n$-$SO_3^-Na^+$.

Comparison of $S_{of}$ Values

Surfactants A-E and O-Q all have the general formula of compound (a) and were manufactured in accordance with the teachings of this invention wherein propoxylation is followed by ethoxylation. Very good oil recoveries were obtained for surfactants B, D, and Q. Moderately good oil recovery was obtained for surfactant E. In all of these floods, the core and the microemulsion contained brine near the optimal salinity for each system. Note further that Q is a 50/50 mixture of O and P, thus demonstrating that surfactants of type (a) can often be mixed together and yield good oil recovery, provided the optimal salinity of the mixture has the appropriate value. Although the solubilization parameters for O, P and Q have not been measured, they should be high. The remaining two floods conducted using propoxylated-ethoxylated surfactants, namely A and C, did not give good oil recovery because they were not run at optimal conditions. Inspection of Table III shows $C_\phi(A) = 120\%$ TSB and $C_\phi(C) = 135\%$ TSB; however, the resident brine in the core and the brine used to prepare the microemulsions injected was 100% TSB in both cases. Hence, good oil recovery would not be expected.

In the case of surfactant R, the order of oxyalkalation was reversed so that an average of two moles of ethylene oxide were added to the i-trideyl alcohol first and then an average of 4.2 moles of propylene oxide were added to the ethoxylated material. Even though this flood was carried out at optimum conditions, the oil recovery was poor, as would be anticipated on the basis of the low value of 3.5 for the solubilization parameter. This result demonstrates the importance of propoxylation followed by ethoxylation.

Surfactants F, G and H are of the propoxylated-only type (n=0). No flood could be run for surfactant F since it formed gels. Surfactant G did not give good oil recovery and surfactant H gave only moderately good recovery. Floods using surfactants G and H were, nonetheless, run at conditions close to optimal. This result illustrates that propoxylated-only surfactants often give unsatisfactory oil recovery even when floods are run under close to optimal conditions. Further, floods corresponding to F-H are generally inferior to those corresponding to surfactants of this invention such as, for example, B, D and Q.

Surfactants I-N are all of the ethoxylated-only type (m=0), but a flood was run only in the case of surfactant I. There, the oil recovery was moderately good, but clearly inferior to B, D, E and Q. The results of these tests demonstrate that use of the surfactants of the present invention has significant advantages over the use of those of the prior art. In addition, the use of the propoxylated ethoxylated surfactants permits greater latitude in formulating the microemulsions.

The principle of the invention and the best mode contemplated for applying that principle have been described. It is to be understood that the foregoing is illustrative only and that other means and techniques can be employed without departing from the true scope of the invention defined in the following claims.

We claim:

1. A method for recovering oil from an oil-bearing formation which comprises injecting into said formation a fluid containing an effective amount of surface-active agent having the general formula:

$$R_1O(C_3H_6O)_m(C_2H_4O)_nYX$$

wherein
   $R_1$ is a linear or branched alkyl radical, an alkenyl radical, or an alkyl or alkenyl substituted benzene radical, the non-aromatic portion of the radical containing from 6 to 24 carbon atoms;
   m has an average value of from about 1 to about 10;
   n has an average value of from about 1 to about 10;
   Y is a sulfate, sulfonate, phosphate, or carboxylate group; and
   X is a cation; and
driving said fluid through said formation to displace oil from said formation and recovering the displaced oil.

2. The method of claim 1 wherein Y is a sulfonate having the general formula

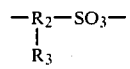

wherein
   $R_2$ is an alkyl, cycloalkyl, alkenyl, alkylaryl, or aryl radical containing up to 8 carbon atoms; and
   $R_3$ is a hydrogen atom, a hydroxyl radical, or an aliphatic radical containing from 1-8 carbon atoms.

3. The method of claim 1 wherein $R_1$ is a branched alkyl substituent containing from 10 to 16 carbon atoms.

4. The method of claim 1 wherein m has an average value of about 2 to about 6 and n has an average value of about 2 to about 6.

5. The method of claim 1 wherein said fluid is an aqueous fluid containing inorganic salts.

6. The method of claim 5 wherein said aqueous fluid is brine from said formation.

7. The method of claim 5 wherein the values of m and n are varied with respect to each other in proportion to the concentration of said inorganic salts in said aqueous fluid so as to optimize the surface activity of said surface-active agent.

8. The method of claim 1 wherein said fluid is a microemulsion.

9. The method of claim 8 wherein said microemulsion is driven through said formation by a slug of thickened water.

10. The method of claim 8 wherein said microemulsion further includes a co-surfactant.

11. The method of claim 8 wherein said microemulsion further includes a co-solvent.

12. The method of claim 8 wherein said microemulsion includes a thickener.

13. The method of claim 8 wherein said microemulsion contains inorganic salts.

14. The method of claim 13 wherein the values of m and n are varied according to a set of curves defined at varying concentrations of said inorganic salts, said curves being generated by measuring optimum salinities as a function of m and n at each of said varying concentrations.

15. The method of claim 8 wherein the precise values of m and n are selected from a plot obtained by:
   (a) preparing a plurality of surface-active agents characterized by said general formula and having different average values of m and n;
   (b) preparing a microemulsion sample which includes one of said plurality of surface-active agents, water, oil, and inorganic salts, the concentration of said salts being such that a balanced minimum microemulsion-oil and microemulsion-water interfacial tension is obtained;
   (c) repeating step (b) for each of said plurality of surface-active agents;
   (d) plotting those values of m versus n which give minimum microemulsion-oil and microemulsion-water interfacial tensions at one concentration of said salts, thereby generating a curve;
   (e) repeating step (d) for other concentrations of said salts to generate a family of curves, each curve defining values of m and n giving balanced minimum interfacial tensions at different concentrations of said salts.

16. The method of claim 1 wherein said surface-active agent is an i-tridecyl ether $(C_3H_6O)_m (C_2H_4O)_n$ sulfate, the value of m ranging from about 2 to about 6 and the value of n ranging from about 2 to about 6.

17. The method of claim 16 wherein said formation contains high concentrations of inorganic salts.

18. The method of enhanced oil recovery which comprises injecting a microemulsion containing an effective amount of surfactant having the general formula:

$$R_1O(C_3H_6O)_m(C_2H_4O)_nYX$$

wherein
- $R_1$ is a $C_{10-16}$ branched chain alkyl radical having at least two branching groups;
- m has an average value of between about 2 and about 6;
- n has an average value of between about 2 and about 6;
- Y is the sulfate or sulfonate group; and
- X is a cation; and driving said microemulsion through said formation to displace oil to a producing well.

19. The method of claim 18 wherein $R_1$ is an i-tridecyl radical.

20. The method of claim 18 wherein said surfactant is present in an amount ranging from about 1 to about 20 volume percent based on the volume of said microemulsion.

21. The method of claim 20 wherein the range is from about 2 to about 12 volume percent.

22. A formulation suitable for injection into a hydrocarbon-bearing formation for enhanced recovery operations which comprises:
(a) 0.25-90% by volume of oil;
(b) 1-95% by volume water;
(c) 1-20% by volume of a surfactant having the general formula:

$$R_1O(C_3H_6O)_m(C_2H_4O)_nYX$$

wherein
- $R_1$ is a linear or branched alkyl radical, an alkenyl radical, or an alkyl or alkenyl substituted benzene radical, the non-aromatic portion of the radical containing from 6 to 24 carbon atoms;
- m has an average value of from about 1 to about 10;
- n has an average value of from about 1 to about 10;
- Y is a sulfate, sulfonate, phosphate or carboxylate group; and
- X is a cation;

(d) 0-250 g/l inorganic salts;
(e) 0-15% by volume of a co-surfactant; and
(f) 0-2% by volume of a thickener.

23. The formulation of claim 22 wherein Y is a sulfonate having the general formula $$-\underset{R_3}{R_2}-SO_3-$$

wherein
- $R_2$ is an alkyl, cycloalkyl, alkenyl, alkylaryl or aryl radical containing up to 8 carbon atoms; and
- $R_3$ is a hydrogen atom, a hydroxyl radical, or an aliphatic radical containing from 1-8 carbon atoms.

24. The formulation of claim 22 wherein $R_1$ is a $C_{10-16}$ branched chain alkyl radical having at least two branching groups.

25. The formulation of claim 24 wherein m has an average value of from about 2 to about 6 and n has an average value of from about 2 to about 6.

26. The formulation of claim 22 wherein said formation contains a brine having a known composition of inorganic salts and wherein the amount of components (a)-(d) are respectively:
(a) 0.25-1%
(b) 80-95%
(c) 2%-12%
(d) substantially the same as that of said brine
and components (e) and (f) are omitted.

* * * * *